United States Patent
Li et al.

(10) Patent No.: US 12,172,929 B2
(45) Date of Patent: Dec. 24, 2024

(54) RED MUD UTILIZATION METHOD BASED ON CO-PROCESSING OF INDUSTRIAL EXHAUST GAS, SEWAGE TREATMENT AND ENVIRONMENT-FRIENDLY AND HIGH PERFORMANCE CIVIL FUNCTIONAL MATERIAL

(71) Applicant: SHANDONG UNIVERSITY, Shandong (CN)

(72) Inventors: Shucai Li, Jinan (CN); Zhaofeng Li, Jinan (CN); Jian Zhang, Jinan (CN); Chunjin Lin, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 788 days.

(21) Appl. No.: 17/283,333

(22) PCT Filed: Jan. 17, 2020

(86) PCT No.: PCT/CN2020/072860
§ 371 (c)(1),
(2) Date: Apr. 7, 2021

(87) PCT Pub. No.: WO2021/093168
PCT Pub. Date: May 20, 2021

(65) Prior Publication Data
US 2022/0306536 A1   Sep. 29, 2022

(30) Foreign Application Priority Data
Nov. 14, 2019   (CN) .......................... 201911115184.5

(51) Int. Cl.
| | | |
|---|---|---|
| *C04B 28/08* | (2006.01) | |
| *B01D 53/14* | (2006.01) | |
| *B01D 53/50* | (2006.01) | |
| *B01D 53/62* | (2006.01) | |
| *C02F 1/28* | (2023.01) | |
| *C02F 103/16* | (2006.01) | |
| *C04B 14/04* | (2006.01) | |
| *C04B 14/10* | (2006.01) | |
| *C04B 28/14* | (2006.01) | |
| *C04B 103/10* | (2006.01) | |
| *C04B 111/00* | (2006.01) | |

(52) U.S. Cl.
CPC .......... *C04B 28/08* (2013.01); *B01D 53/1475* (2013.01); *B01D 53/1481* (2013.01); *B01D 53/507* (2013.01); *B01D 53/62* (2013.01); *C02F 1/281* (2013.01); *C04B 14/045* (2013.01); *C04B 14/104* (2013.01); *C04B 28/14* (2013.01); *B01D 2252/10* (2013.01); *B01D 2257/302* (2013.01); *B01D 2257/504* (2013.01); *B01D 2258/025* (2013.01); *C02F 2103/16* (2013.01); *C04B 2103/10* (2013.01); *C04B 2111/0075* (2013.01)

(58) Field of Classification Search
None
See application file for complete search history.

(56) References Cited

U.S. PATENT DOCUMENTS

| | | | |
|---|---|---|---|
| 7,922,792 B1 * | 4/2011 | Soong .................... | B01D 53/62 95/232 |
| 2018/0346380 A1 | 12/2018 | Nie et al. | |

FOREIGN PATENT DOCUMENTS

| | | | |
|---|---|---|---|
| CN | 101143312 A | 3/2008 | |
| CN | 103664085 A | 3/2014 | |
| CN | 108439831 A | 8/2018 | |
| CN | 110170295 A | 8/2019 | |
| CN | 110759680 A * | 2/2020 | ......... B01D 53/1475 |
| KR | 10-2015-0068180 A | 6/2015 | |

OTHER PUBLICATIONS

Machine translation of CN-110759680-A (Year: 2020).*
Aug. 11, 2020 Search Report issued in International Patent Application No. PCT/CN2020/072860.
Aug. 11, 2020 Written Opinion of the International Searching Authority issued in International Patent Application No. PCT/CN2020/072860.
Jul. 16, 2020 Office Action issued in Chinese Patent Application No. 201911115184.5.

* cited by examiner

*Primary Examiner* — Michael Forrest
(74) *Attorney, Agent, or Firm* — Oliff PLC

(57) ABSTRACT

A red mud utilization method based on co-processing of industrial exhaust gas, sewage treatment and an environment-friendly and high-performance civil functional material, belongs to the technical field of environmental science and cementitious material preparation, and relates to a preparation process of a solid waste-based cementitious material, specifically including the steps: preparing an environment-friendly and high-performance red mud-based civil functional material by using slag obtained after sewage treatment with red mud and other solid wastes in physical and chemical activation and high-temperature calcination methods. The compressive strength of a solid waste-based cementitious material prepared by using the method can reach 29 MPa, the leaching quantity (lower than 3.0 ppm) of toxic elements such as heavy metals is far lower than the national standard requirement, and a solid waste-based cementitious material with great performance can be prepared.

13 Claims, No Drawings

RED MUD UTILIZATION METHOD BASED ON CO-PROCESSING OF INDUSTRIAL EXHAUST GAS, SEWAGE TREATMENT AND ENVIRONMENT-FRIENDLY AND HIGH PERFORMANCE CIVIL FUNCTIONAL MATERIAL

BACKGROUND

Technical Field

The present invention belongs to the technical fields of environmental science and cementitious material preparation, and particularly relates to the related fields of solid waste-based cementitious material preparation, industrial exhaust gas utilization and sewage treatment.

Related Art

Information of the Related Art part is merely disclosed to increase the understanding of the overall background of the present invention, but is not necessarily regarded as acknowledging or suggesting, in any form, that the information constitutes the prior art known to a person of ordinary skill in the art.

With rapid development of urban industry, the wastewater discharge amount is increasing, and thus the water pollution degree is increased. It is shown through national data that the sewage discharge amount in China in 2007 was 65.7 billion tons, which was increased by 4% than that in 2006. The industrial sewage discharge amount was 23.6 billion tons, which was 4.2% of the total sewage amount and was increased by 2.5% than that in 2006. In 2007, nearly 30% of water areas in China were poor grade V and could no longer be used directly. The wastewater pollution problem needs to be solved urgently.

The output of red mud in China is 70 million tons per year, and the cumulative stock is nearly 1 billion tons. Due to stockpiling of the red mud, great harm is caused to the environment and ecology, and at the same time, a high market potential for resource utilization of solid wastes is achieved. Due to a large specific surface area and a loose and porous structure, the red mud is widely used in the field of sewage treatment. But slag obtained after sewage treatment is still a solid waste harmful to the environment.

In addition, a large number of civil functional materials are required for a large amount of basic transportation engineering construction. At present, traditional Portland cement materials have the disadvantages that raw materials are non-renewable and energy consumption for preparation is high, and thus low-cost and high-quality engineering materials are urgently needed in the field of basic transportation construction.

SUMMARY

In order to solve the problems above, the present invention provides a red mud utilization method based on co-processing of industrial exhaust gas, sewage treatment and an environment-friendly and high-performance civil functional material, which is a process and a method including the steps: treating red mud with industrial exhaust gas first to reduce the alkalinity of the red mud, preparing a red mud-based sewage treatment agent and then preparing an environment-friendly civil functional material by using slag obtained after sewage treatment with red mud. According to the process proposed in the present invention, the problems of industrial exhaust gas emission and stockpiling of a red mud-based sewage treatment agent can be solved, and a high-performance solid waste-based civil functional material can be prepared; red mud can adsorb ions such as $Ca^{2+}$, $Na^+$, $SO_4^{2-}$, and $Cl^-$ in a sewage treatment process, and the mechanical strength of a red mud-based cementitious material can be improved.

To achieve the foregoing technical objective, the present invention adopts the following technical solutions:

According to a red mud-based environment-friendly and high-performance civil functional cementitious material, industrial exhaust gas is used to perform carbonization treatment on red mud first, and alkaline components such as $Na_2O$, $K_2O$, and CaO in the red mud undergo a carbonation reaction under the action of acidic gases such as $CO_2$ and $SO_2$, so that the alkalinity of the red mud is reduced. Then, the red mud after carbonization treatment is used to prepare a red mud-based sewage treatment agent for sewage treatment. Finally, red mud-based sewage treatment slag is used to prepare a red mud-based environment-friendly and high-performance civil functional material based on a concept of synergy and complementarity of physical and chemical properties, and the material includes the following raw materials in parts by weight: 10-90 parts of slag obtained after sewage treatment with red mud, 20-60 parts of a cementing agent, 2-8 parts of an activator, and 1-5 parts of a toxic element curing agent.

As an important way to realize large-scale recycling of solid wastes, the environment-friendly building material prepared in this application meets development needs of the environmental protection industry and the green construction industry and also meets the inevitable requirements for ecological civilization and green, circular and low-carbon development of the society.

It is found through a research in this application that the alkalinity of the red mud can be reduced by carbonization treatment of the red mud, and secondary pollution caused by the red mud in a sewage treatment process can be avoided. However, when the pH value is too low, the adsorption performance of a red mud adsorbent is reduced, and therefore, the pH of the treated red mud should be about 8.

It is found through a research in this application that the adsorption performance of the red mud is affected by the carbonization pressure, temperature and time. Therefore, in some embodiments, the carbonization pressure for the red mud is 0.4-1.5 MPa, the carbonization temperature is 60-200° C., the industrial exhaust gas may be one of exhaust gas of a power plant, exhaust gas of an iron and steel industry, exhaust gas of a building material industry and the like, and the carbonization time is 6-24 hours to obtain an expected carbonization effect and improve the adsorption performance of the red mud.

In this application, a reaction of acidic gases ($CO_2$, $SO_2$ and the like) in the industrial exhaust gas and alkaline substances in the red mud is mainly used to make the pH value of the red mud reach about 8. Therefore, in practical applications, the source, type and acidic gas content of the industrial exhaust gas are not specially limited.

In some embodiments, a red mud-based sewage treatment agent includes 60-100 parts of carbonized red mud, 0-20 parts of fly ash and 3-5 parts of a treatment agent, and the treatment agent is one or more of cetyl ammonium bromide, fatty amines, sodium linear alkylbenzene sulfonate and the like.

In some embodiments, the material includes the following raw materials in parts by weight: 10-50 parts of slag obtained after sewage treatment with red mud, 20-40 parts of a cementing agent, 2-5 parts of an activator, and 1-3 parts of a toxic element curing agent. Based on a synergy and complementarity utilization theory (different types of solid wastes are compounded according to components of the solid wastes to obtain a constant chemical and mineral composition ratio), a utilization method of slag obtained after sewage treatment with red mud is put forward. It is found through systematic research and experimental exploration that a cementitious material prepared according to a formula above can have the advantages of high compressive strength and low leaching quantity of toxic elements, and a good industrial prospect is achieved.

In some embodiments, the material includes the following raw materials in parts by weight: 50-90 parts of slag obtained after sewage treatment with red mud, 40-60 parts of a cementing agent, 5-8 parts of an activator, and 3-5 parts of a toxic element curing agent. The compressive strength of a solid waste-based cementitious material prepared by using the method provided in the present invention can reach 29 MPa, the leaching quantity of toxic elements such as heavy metals is far lower than the national standard requirement, and a solid waste-based cementitious material with great performance can be prepared.

In this application, a specific method for sewage treatment with red mud and the source and type of sewage are not specially limited. In some embodiments, a preparation method of red mud used to treat sewage includes acidification and heat treatment of the red mud and use of the red mud modified with a modifier. The compressive strength of a solid waste-based cementitious material is improved, and the leaching quantity of toxic elements is reduced.

In this application, the specific type of the cementing agent is not specially limited. In some embodiments, in order to control the setting time and curing strength of a solid waste-based cementitious material and other indexes according to different construction requirements, the cementing agent may be one or more of Portland cement, sulfoaluminate cement, ferroaluminate cement, magnesium phosphate cement and aluminate cement.

It is found through a research that the activity of slag obtained after sewage treatment with red mud and the microstructure of a hydration product can be improved by adding a certain number of an activator into the slag obtained after sewage treatment with red mud. The strength of a solid waste-based cementitious materials is improved, and at the same time, heavy metal ions adsorbed in the red mud are better cured. Therefore, in some embodiments, the activator is one or more of hydroxide, silicate, sulfate, carbonate, and phosphate. The compressive strength of a prepared solid waste-based cementitious material is improved, and the leaching quantity of toxic elements is reduced.

In some embodiments, the toxic element curing agent includes a metal organic framework material, bentonite, fly ash, hydrotalcite, amino carboxylic acid or a polyamine chelating agent. Heavy metal elements adsorbed in the red mud are effectively cured and prevented from polluting the environment.

The present invention also provides a preparation method of a red mud-based high-performance civil functional cementitious material, including the steps:
uniformly mixing the slag obtained after sewage treatment with red mud and other solid wastes and performing calcination and grinding to obtain a high-performance cementitious material. According to the preparation method in this application, steps are simple and efficient, the product quality is stable, and industrial production is easily achieved.

In some embodiments, a mixing method includes wet mixing. Materials are rotated in a container to stay in a semi-fluid and efficient mixing state, and dispersed by collision to achieve sufficient mixing.

It is found through a research that the activity of a solid waste-based cementitious material can be improved by calcination, and a subsequent hydration reaction and molding are facilitated. Therefore, in some embodiments, calcination conditions include heating to 1,350-1,400° C., heat preservation for 2.5-3 hours and cooling. The strength of a solid waste-based cementitious material is improved, and the leaching quantity of toxic elements is reduced.

In some embodiments, grinding is performed until a specific surface area is 300-320 $m^2/kg$. The specific surface area is increased.

The present invention also provides application of any one of the red mud-based high-performance civil functional cementitious materials above in construction of roads, bridges, underground projects or buildings.

The present invention has the following beneficial effects:
(1) By using industrial exhaust gas to treat red mud, the exhaust gas can be purified, and toxic gas emission is reduced.
(2) By using industrial exhaust gas to treat red mud, the alkalinity of the red mud can be reduced, secondary pollution caused by the red mud in a sewage treatment process is avoided, and the adsorption efficiency of the red mud on pollutant components in sewage is improved.
(3) Based on a synergy and complementarity utilization theory (different types of solid wastes are compounded according to components of the solid wastes to obtain a constant chemical and mineral composition ratio), a utilization way of slag obtained after sewage treatment with red mud is put forward in the present invention.
(4) It is found through tests that the compressive strength of a solid waste-based cementitious material prepared by using the method provided in the present invention can reach 29 MPa, the leaching quantity (lower than 3.0 ppm) of toxic elements such as heavy metals is far lower than the national standard requirement, and a solid waste-based cementitious material with great performance can be prepared.
(5) The operation method of this application is simple and low in cost and has universality, and large-scale production is easily achieved.

DETAILED DESCRIPTION

It should be noted that the following detailed descriptions are all exemplary and are intended to provide a further understanding of this application. Unless otherwise indicated, all technical terms and scientific terms used in this application have the same meaning as commonly understood by a person of ordinary skill in the technical field to which this application belongs.

It should be noted that terms used herein are only for describing specific implementations and are not intended to limit exemplary implementations according to the present application. As used herein, the singular form is also intended to include the plural form unless the context clearly dictates otherwise. In addition, it should further be understood that terms "comprise" and/or "include" used in this specification indicate that there are features, steps, operations, devices, components, and/or combinations thereof.

As introduced in the related art, in order to solve the problem of difficult treatment of industrial exhaust gas, industrial solid wastes such as red mud and sewage, the present invention provides a method for preparing an environment-friendly civil functional material by using slag obtained after sewage treatment with red mud.

On the one hand, industrial exhaust gas is used to perform carbonization treatment on red mud to prepare a red mud-based sewage treatment agent first, and then a red mud-based high-performance civil functional cementitious material includes 10-90 parts of slag obtained after sewage treatment with red mud, 20-60 parts of a cementing agent, 2-8 parts of an activator, and 1-5 parts of a toxic element curing agent. On the other hand, the slag obtained after sewage treatment with red mud and other solid wastes are subjected to high-temperature calcination to prepare a high-performance cementitious material including 50-60 parts of red mud, 20-40 parts of steel slag, 10-30 parts of desulfurized gypsum, and 5-20 parts of calcium carbide slag.

The red mud used to treat sewage may be Bayer red mud, sintered red mud and combined red mud.

The treated sewage may be industrial wastewater, domestic sewage and agricultural wastewater.

The cementing agent may be one or more of Portland cement, sulfoaluminate cement, ferroaluminate cement, magnesium phosphate cement, and aluminate cement.

The activator is one or more of hydroxide, silicate, sulfate, carbonate, and phosphate.

The toxic element curing agent includes a metal organic framework material, bentonite, fly ash, hydrotalcite, amino carboxylic acid, a polyamine chelating agent and the like.

A calcination method includes wet mixing of various solid wastes, heating to 1,350° C., heat preservation for 3 hours, air cooling, natural cooling or water cooling to room temperature, and grinding until a specific surface area is 300 m²/kg.

The technical solutions of this application are described below by using specific embodiments.

Embodiment 1

Based on the first technical solution mentioned in the claims, a method for preparing an environment-friendly civil functional material by using slag obtained after sewage treatment with red mud included the following steps (herein a first step included preparation of raw materials, grinding and sieving, and a second step included blending of the raw materials and preparation of a material):

(1) Bayer red mud was used, dried, ground and sieved with a 200-mesh sieve to prepare a slurry with a water-cement ratio of 1.0.

(2) Carbonization parameters were adjusted: the pressure was 0.8 MPa, the temperature was 80° C., industrial exhaust gas of a power plant was used, and the carbonization time was 8 hours (to make the pH of the red mud reach 8). Then the red mud after carbonization treatment was dried, ground and sieved with a 300-mesh sieve for spare use.

(3) A sewage treatment agent was prepared: 90 parts of red mud after carbonization treatment, 10 parts of fly ash, and 4 parts of cetyl ammonium bromide were thoroughly mixed for spare use.

(4) The prepared red mud-based sewage treatment agent was used to treat high-salt wastewater in an iron and steel smelting process (the main chemical composition is shown in Table 1), and the red mud and the high-salt wastewater were mixed and stirred for 30 minutes (the dosing concentration was 50 g/L) and then subjected to suction filtration and drying for spare use.

TABLE 1

| Chemical composition of high-salt wastewater | | | | | |
|---|---|---|---|---|---|
| $Ca^{2+}$ (mg/L) | $Cl^-$ (mg/L) | $SO_4^{2-}$ (mg/L) | $NO_3^-$ (mg/L) | COD (%) (mg/L) | pH value |
| 34.4 | 130 | 0.28 | 12.7 | 69 | 7.82 |

(5) Slag obtained after sewage treatment with red mud, ordinary Portland cement, sodium silicate, and bentonite were dried to a moisture content of lower than 1%, ground and sieved with a 200-mesh sieve.

(6) 60 parts of red mud, 20 parts of ordinary Portland cement, 10 parts of sodium silicate, and 6 parts of bentonite were weighed. Water was added until a water-cement ratio was 0.4. The mixture was stirred for 30 seconds and poured into a test mold. Parameters such as strength and the setting time were tested.

A GBT 17671-1999 cement mortar strength test method was adopted for testing the strength. The leaching quantity of heavy metals was tested on the basis of GB/T 30810-2014. Performance indexes as shown in Table 2 are obtained according to a test method.

TABLE 2

| Performance test results | | | |
|---|---|---|---|
| Setting time | 3 d compressive strength | 28 d compressive strength | Leaching quantity of heavy metals |
| 8 h 20 s | 9.6 MPa | 18.6 MPa | 2.9 ppm |

Embodiment 2

(1) Slag obtained after sewage treatment with red mud (same as that in Embodiment 1), granulated blast furnace slag, sodium silicate and bentonite were dried to a moisture content of lower than 1%, ground and sieved with a 200-mesh sieve.

(2) 40 parts of red mud, 50 parts of granulated blast furnace slag, 10 parts of sodium hydroxide, and 5 parts of fly ash were weighed. Water was added until a water-cement ratio was 0.4. The mixture was stirred for 30 seconds and poured into a test mold. Parameters such as strength and the setting time were tested.

A GBT 17671-1999 cement mortar strength test method was adopted for testing strength. The leaching quantity of heavy metals is tested on the basis of GB/T 30810-2014. Performance indexes as shown in Table 3 are obtained according to a test method.

TABLE 3

| Performance test results | | | |
|---|---|---|---|
| Setting time | 3 d compressive strength | 28 d compressive strength | Leaching quantity of heavy metals |
| 5 h 10 s | 11.1 MPa | 22.4 MPa | 0.83 ppm |

Embodiment 3

(1) 50 parts of red mud, 25 parts of steel slag, 20 parts of desulfurized gypsum, and 10 parts of calcium carbide slag were weighed. Water was added until a water-cement ratio was 0.6. The mixture was mixed uniformly.

(2) The mixed sample was calcined to 1,350° C. Heat preservation was performed for 3 hours. The mixed sample was dried after water cooling.

(3) The calcined sample was ground to a specific surface area of 400 m²/kg. Water was added until a water-cement ratio was 0.4. The mixture was stirred for 30 seconds and poured into a test block. Parameters such as the test strength and the setting time were tested.

A GBT 17671-1999 cement mortar strength test method was adopted for testing strength. The leaching quantity of heavy metals was tested on the basis of GB/T 30810-2014. Performance indexes as shown in Table 4 are obtained according to a test method.

TABLE 4

| Performance test results | | | |
|---|---|---|---|
| Setting time | 3 d compressive strength | 28 d compressive strength | Leaching quantity of heavy metals |
| 3 h 25 s | 21.1 MPa | 42.4 MPa | 0.09 ppm |

It should be finally noted that the foregoing descriptions are merely preferred embodiments of the present invention, but are not intended to limit the present invention. Although the present invention has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made within the spirit and principle of the present invention shall fall within the protection scope of the present invention. The specific implementations of the present invention are described above, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A red mud-based environment-friendly and high-performance civil functional cementitious material, comprising the following raw materials in parts by weight: 10-90 parts of slag obtained after sewage treatment with red mud, 20-60 parts of a cementing agent, 2-8 parts of an activator, and 1-5 parts of a toxic element curing agent;
wherein a preparation method of the slag obtained after sewage treatment with red mud comprises the steps: carbonizing red mud with industrial exhaust gas, preparing the carbonized red mud into a sewage treatment agent, treating sewage, and collecting the slag obtained after sewage treatment with red mud.

2. The red mud-based environment-friendly and high-performance civil functional cementitious material according to claim 1, wherein the carbonization treatment has a pressure of 0.4-1.5 MPa, a carbonization temperature of 60-200°° C., and a carbonization time of 6-24 hours, and the industrial exhaust gas is one of exhaust gas of a power plant, exhaust gas of an iron and steel industry and exhaust gas of a building material industry.

3. The red mud-based environment-friendly and high-performance civil functional cementitious material according to claim 1, wherein the red mud-based sewage treatment agent comprises the following raw materials in parts by weight: 60-100 parts of carbonized red mud, 0-20 parts of an enhancer, and 3-5 parts of a surfactant.

4. The red mud-based environment-friendly and high-performance civil functional cementitious material according to claim 1, comprising the following raw materials in parts by weight: 10-50 parts of slag obtained after sewage treatment with red mud, 20-40 parts of a cementing agent, 2-5 parts of an activator, and 1-3 parts of a toxic element curing agent.

5. The red mud-based environment-friendly and high-performance civil functional cementitious material according to claim 1, wherein the cementing agent is one or more of Portland cement, sulfoaluminate cement, ferroaluminate cement, magnesium phosphate cement, and aluminate cement.

6. The red mud-based environment-friendly and high-performance civil functional cementitious material according to claim 1, wherein the toxic element curing agent comprises a metal organic framework material, bentonite, fly ash, hydrotalcite, amino carboxylic acid or a polyamine chelating agent.

7. The red mud-based environment-friendly and high-performance civil functional cementitious material according to claim 1, comprising the following raw materials in parts by weight: 50-90 parts of slag obtained after sewage treatment with red mud, 40-60 parts of a cementing agent, 5-8 parts of an activator, and 3-5 parts of a toxic element curing agent.

8. The red mud-based environment-friendly and high-performance civil functional cementitious material according to claim 1, wherein the activator is one or more of hydroxide, silicate, sulfate, carbonate and phosphate.

9. A red mud utilization method based on co-processing of industrial exhaust gas, sewage treatment and an environment-friendly and high-performance civil functional material, comprising the steps:
carbonizing red mud with industrial exhaust gas, preparing the carbonized red mud into a sewage treatment agent, treating sewage, and collecting slag obtained after sewage treatment with red mud; and
uniformly mixing the slag obtained after sewage treatment with red mud and other solid wastes and performing calcination and grinding to obtain a high-performance cementitious material.

10. The red mud utilization method based on co-processing of industrial exhaust gas, sewage treatment and an environment-friendly and high-performance civil functional material according to claim 8, wherein the uniformly mixing comprises wet mixing.

11. The red mud utilization method based on co-processing of industrial exhaust gas, sewage treatment and an environment-friendly and high-performance civil functional material according to claim 9, wherein conditions for the calcination comprise heating to 1,350-1,400° C., heat preservation for 2.5-3 hours and cooling.

12. The red mud utilization method based on co-processing of industrial exhaust gas, sewage treatment and an environment-friendly and high-performance civil functional material according to claim 9, wherein the grinding is performed until a specific surface area is 300-320 m²/kg.

13. Application of the red mud-based environment-friendly and high-performance civil functional cementitious material according to claim 1 in construction of roads, bridges, underground projects or buildings.

\* \* \* \* \*